US007004607B2

(12) United States Patent
Aguinaga

(10) Patent No.: US 7,004,607 B2
(45) Date of Patent: Feb. 28, 2006

(54) MOTORIZED LAMP ADJUSTER

(75) Inventor: Raul Aguinaga, Milwaukee, WI (US)

(73) Assignee: Asyst Technologies, LLC, Kenosha, WI (US)

(*) Notice: Subject to any disclaimer, the term of this patent is extended or adjusted under 35 U.S.C. 154(b) by 29 days.

(21) Appl. No.: 10/692,293

(22) Filed: Oct. 23, 2003

(65) Prior Publication Data

US 2005/0088852 A1    Apr. 28, 2005

(51) Int. Cl.
F21V 19/02    (2006.01)
F21V 21/14    (2006.01)

(52) U.S. Cl. ............... 362/528; 362/515; 362/524; 362/529

(58) Field of Classification Search ........... 362/487, 362/507, 512, 523–524, 269–272, 285–286, 362/514–515, 528–529
See application file for complete search history.

(56) References Cited

U.S. PATENT DOCUMENTS

| 4,524,407 | A | * | 6/1985  | Igura ................. 362/465 |
| 4,916,587 | A | * | 4/1990  | Hirose et al. ......... 362/460 |
| 5,181,429 | A | * | 1/1993  | Sieber ................ 74/89.42 |
| 5,251,114 | A | * | 10/1993 | Cantin et al. ......... 362/286 |
| 5,394,318 | A | * | 2/1995  | Komachi .............. 362/420 |
| 5,580,149 | A |   | 12/1996 | Kusagaya |
| 5,673,991 | A | * | 10/1997 | Eickhoff et al. ....... 362/513 |
| 5,707,133 | A | * | 1/1998  | Burton ................ 362/460 |
| 5,906,431 | A | * | 5/1999  | Chianale et al. ....... 362/515 |
| 5,911,502 | A | * | 6/1999  | Zillgitt et al. ........ 362/508 |
| 6,012,829 | A | * | 1/2000  | Natchoo ............... 362/524 |
| 6,238,071 | B1| * | 5/2001  | Fratty ................ 362/514 |
| 6,257,747 | B1| * | 7/2001  | Burton ................ 362/524 |
| 6,286,985 | B1| * | 9/2001  | Ohshio et al. ......... 362/512 |
| 6,345,905 | B1| * | 2/2002  | Kibayashi et al. ...... 362/464 |
| 6,428,196 | B1| * | 8/2002  | Deguchi et al. ........ 362/515 |
| 6,568,837 | B1| * | 5/2003  | Denley ................ 362/463 |
| 6,623,147 | B1| * | 9/2003  | Hayami et al. ......... 362/467 |
| 6,641,292 | B1| * | 11/2003 | Miki et al. ........... 362/513 |
| 6,773,153 | B1| * | 8/2004  | Burton ................ 362/528 |

FOREIGN PATENT DOCUMENTS

EP        0956998 A1    11/1999

* cited by examiner

Primary Examiner—Stephen Husar
Assistant Examiner—Jason Han
(74) Attorney, Agent, or Firm—Brian G Gilpin; Godfrey & Kahn, S.C.

(57) ABSTRACT

A motorized adjuster for adjusting the aim of a lamp having a housing, motor, and control rod. The control rod passes through the motor. An anti-rotation gear is positioned inside the housing. The control rod passes through the gear. A flex point is positioned inside the housing to functionally engage the gear. The adjuster may be operated manually or electrically. Manual operation is accomplished by actuating a driver inserted into the housing. Electrical operation is accomplished by actuating the motor. Actuating the driver or the motor causes the control rod to move along its axis.

25 Claims, 8 Drawing Sheets

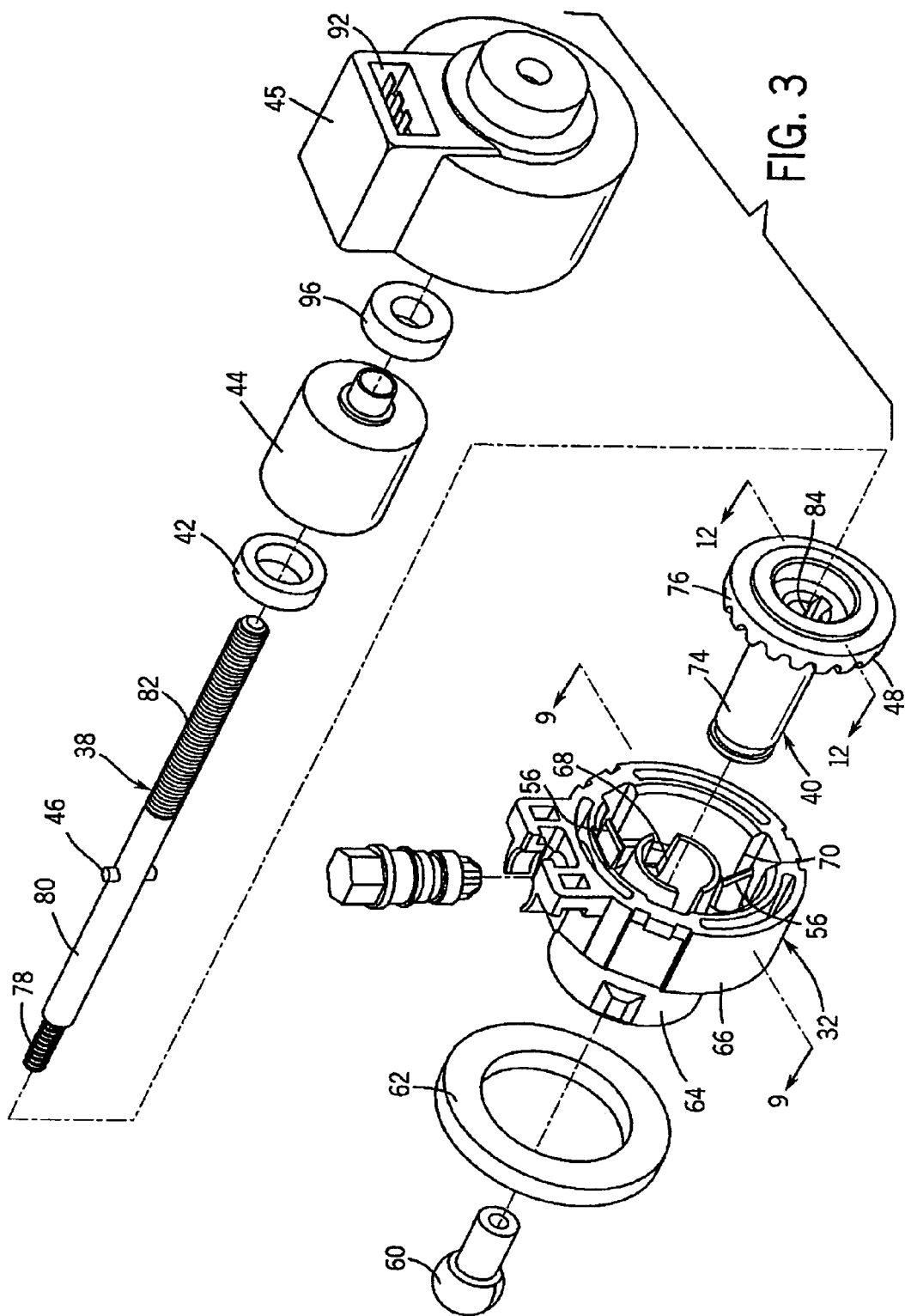

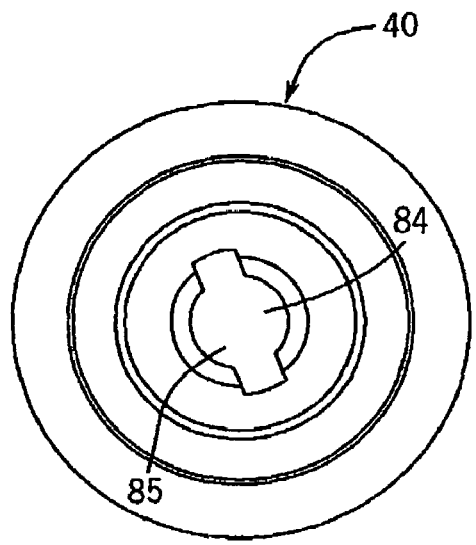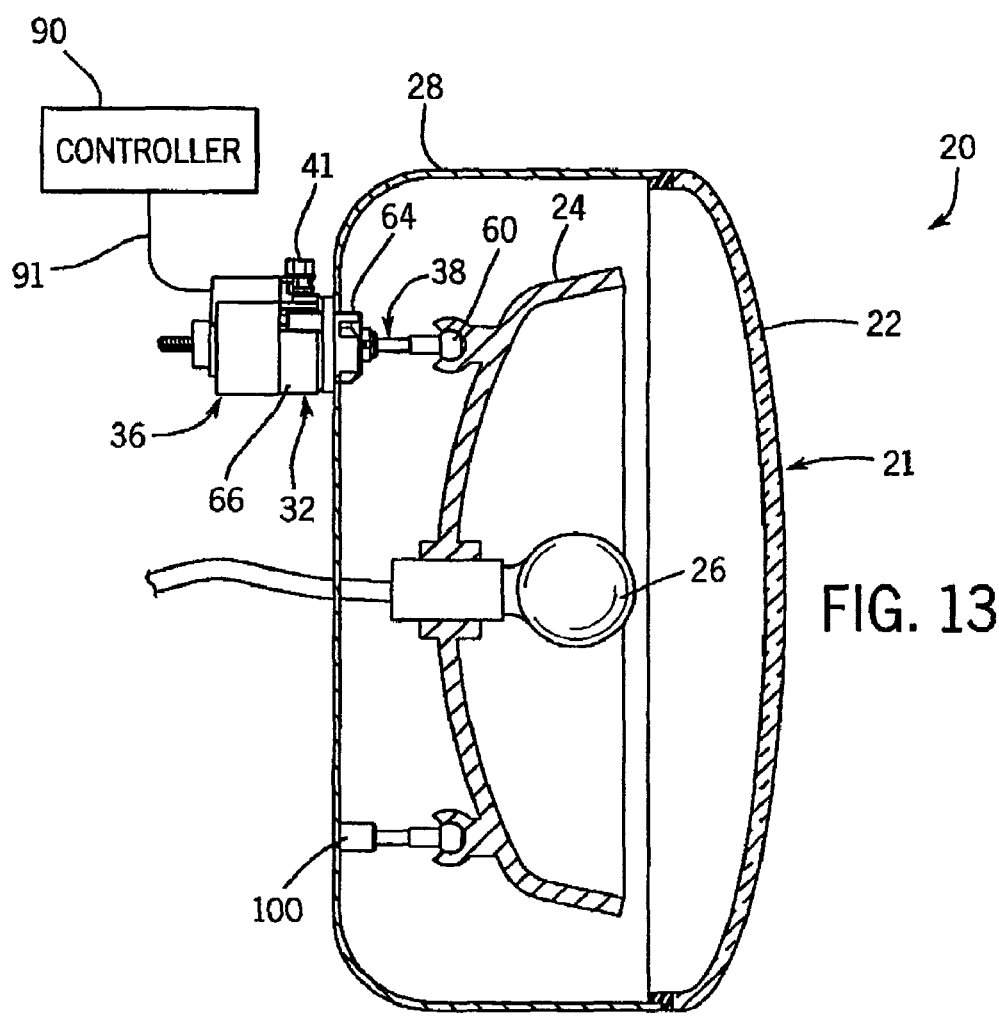

MOTORIZED LAMP ADJUSTER

BACKGROUND OF THE INVENTION

The present invention relates generally to adjusters which are used to adjust the aim of a vehicle lamp. Specifically, this invention relates to a motorized adjuster used to adjust the aim of a vehicle lamp.

Vehicles such as automobiles typically have several lamps including headlamps and fog lamps. These lamps generally comprise a reflector sealed to a lens with a bulb therein. These lamps are securely fit into mounting brackets. The lamps are usually pivotally engaged to the mounting bracket at a plurality of points. The mounting brackets are attached to the vehicle. Together, a lamp and a mounting bracket form a complete lamp assembly. Once the lamp assembly has been manufactured and installed into a vehicle, the aim of the lamp must be adjusted to comply with federal and state regulations. As a result of accidents, maintenance, and normal vibrations and wear, the aim of the lamp must be occasionally adjusted during the lifetime of the vehicle.

One method of adjusting the aim of the lamp involves using an adjuster. The adjuster may be formed as part of the mounting bracket or may be a separate part that communicates with both the lamp and the mounting bracket. One known type of adjuster comprises a housing and a control rod extending there from. The control rod is engaged to lamp. Actuation or operation of the adjuster causes the control rod to move with respect to the lamp assembly. Such movement causes the lamp to pivot with respect to the mounting bracket, thereby affecting the aim of the lamp.

One example of this type of adjuster, such as the one disclosed in U.S. Pat. No. 6,257,747 to Burton, requires manual operation. The housing of the adjuster has an opening and a gear positioned inside the housing. The gear is functionally engaged to the control rod. A driver is inserted into the opening and interacts with the gear. Actuation of the driver results in rotation of the gear and engaged control rod. The gear translates actuation of the driver into movement of the control rod. Numerous variations and improvements exist on this concept.

A manual adjuster has limited applicability. Many countries, including most of Europe, require a driver to be able to adjust the aim of a vehicle's lamps from inside the cabin. Additionally, luxury vehicles are now offering lamps that track and illuminate the direction of the vehicle or that adjusts the aim of the lamp to compensate for the pitch of the road or weight of the vehicle (i.e. driving on hilly terrain or with a heavy load in the vehicle). The aim of the lamp is automatically adjusted as the steering wheel is turned or as a result of the relative pitch of the suspension. A computer coordinates the degree of turn of the steering wheel, the speed of the vehicle, and/or the pitch of the suspension with the aim of the lamps. This coordination requires a high degree of precision. A driver cannot safely turn a steering wheel and manually adjust the aim of the vehicle's lamps at the same time.

A number of motorized lamp adjusters have been developed to provide improved functionality. Many of these adjusters provide for both manual and motorized operation. In practice, the adjusters are manually operated to aim the lamp during manufacture, maintenance, and repair of the vehicle. The adjusters rely on motorized operation to aim the lamp while the vehicle is on the road. These adjusters can be connected to control units that provide for automatic adjustments while the vehicle is driven. Examples of such adjusters are disclosed in U.S. Pat. No. 5,394,318 to Komachi; U.S. Pat. No. 5,673,991 to Eickhoff et al.; and U.S. Pat. No. 6,012,829 to Natchoo. These adjusters all use an electric motor to longitudinally move a control rod. The motors are offset from the control rod and located inside the adjuster housing. These adjusters rely on a series of gears, speed reducers, circuits, potential meters, and transmissions to translate the power generated by the motor into longitudinal movement of the control rod. As such, these adjusters employ a series of parts. Each part must be separately manufactured. The parts are then assembled inside the housing to form the adjuster. Using multiple parts increases the potential for malfunction, breakage and general wearing of the adjuster. Further, using a series of parts results in a larger housing and thus a larger adjuster. Such an adjuster requires more space in a vehicle, thereby affecting the overall design and manufacture of the vehicle and making the overall cost of both the adjuster and the vehicle more expensive.

Accordingly, a need exists for an improved motorized lamp adjuster that solves these and other deficiencies in the prior art. Of course, the present invention may be used in a multitude of situations where similar performance capabilities are required.

SUMMARY OF THE INVENTION

The present invention provides a motorized lamp adjuster that is cost-effective, provides improved functionality, and which solves certain of the problems raised or not solved by existing designs.

The adjuster includes a housing, a motor, and a control rod. In one embodiment, the motor consists of a stator, integrated connector, rotor, and bearing. The control rod passes through the housing and the motor and is functionally engaged by the motor such that operation of the motor causes axial movement of the control rod. In one embodiment, an anti-rotation gear is positioned inside the housing such that the control rod passes through and is functionally engaged by the anti-rotation gear. The anti-rotation gear is used to operate the adjuster manually. The anti-rotation gear also prevent the control rod from rotating when the motor is in use. In one embodiment, the housing has at least one flex point positioned therein such that the anti-rotation gear functionally engages the flex point and is biased against rotation. In one embodiment, the control rod has a rotation point and the anti-rotation gear is configured to geometrically mate with the rotation point such that manual rotation of the anti-rotation gear causes the control rod to rotate.

In one embodiment, the motor is a bi-polar stepper motor that has a magnetic rotor and a stator unit. The magnetic rotor is functionally engaged inside the stator unit and the control rod passes through a threaded portion of the magnetic rotor. In motorized adjustment of the adjuster, rotation of the magnetic rotor about the control rod causes axial movement of the control rod.

The present invention may also include a lamp assembly. The lamp assembly has a mounting bracket, a lamp pivotally engaged within the mounting bracket, and an adjuster in accordance with the present invention. The adjuster is securely engaged to the mounting bracket and functionally engaged to the lamp. Further, a power source and/or control unit is electrically connected to the motor of any embodiment of the present invention if motorized adjustment is desired.

The housing of the adjuster is securely engaged to the mounting bracket while the control rod is functionally engaged to the lamp. The adjuster adjusts the aim of a lamp through movement of the control rod. The adjuster can be operated manually or electrically.

The adjuster is operated manually by inserting a driver into the housing and rotating the driver. In one embodiment, the driver is inserted through a driver input locator in the housing. Once inserted, the driver functionally engages the control rod through the anti-rotation gear such that actuation of the driver causes the control rod to rotate and move axially with respect to the lamp. In an alternative embodiment, the driver may be included as part of the adjuster assembly.

While one possible application of the present invention is in connection with a vehicle lamp, many other applications are possible and references to use in connection with a vehicle lamp should not be deemed to limit the uses of the present invention. The terms "lamp," "mounting bracket," "lamp assembly," "control rod," "housing" or "ball" as used herein should not be interpreted as being limited to specific forms, shapes, or compositions of a lamp, mounting bracket, reflector, control rod, housing, or ball. Rather, the lamp, mounting bracket, reflector, control rod, housing, and ball may have a wide variety of shapes and forms and may be composed of a wide variety of materials. These and other objects and advantages of the present invention will become apparent from the detailed description, claims, and accompanying drawings.

DESCRIPTION OF THE DRAWINGS

FIG. 3 is an exploded view of the motorized adjuster of FIG. 1;

FIG. 4 is a partial cross sectional view of the motorized adjuster of FIG. 1 taken along the plane 4—4 in FIG. 1, shown with the housing removed;

FIG. 12 is a cross sectional view of the motorized adjuster of FIG. 3 taken along the plane 12—12 in FIG. 3; and, FIG. 13 is a partial cross sectional view of a lamp assembly in accordance with one embodiment of the present invention.

DETAILED DESCRIPTION OF THE PREFERRED EMBODIMENTS

Figure 1:
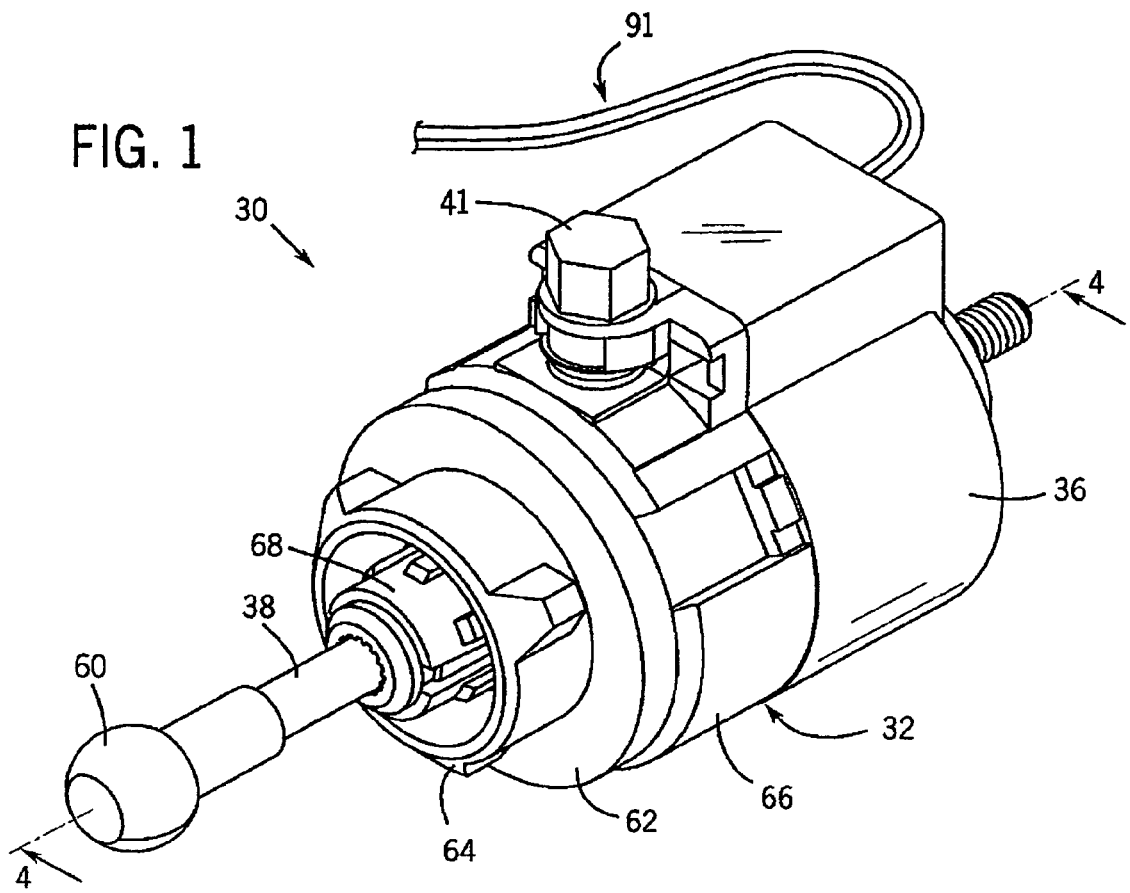
FIG. 1 is a perspective view of a motorized adjuster in accordance with one embodiment of the present invention.

Illustrative embodiments of a motorized lamp adjuster (identified generally as 30) in accordance with the present invention are shown in FIGS. 1 through 12. While the invention may be susceptible to embodiment in different forms, there are shown in the drawings, and herein are described in detail, certain illustrative embodiments with the understanding that the present disclosure is to be considered an exemplification of the principles of the invention, and is not intended to limit the invention to those embodiments illustrated and described herein. Additionally, features illustrated and described with respect to one embodiment could be used in connection with other embodiments.

Figure 11:
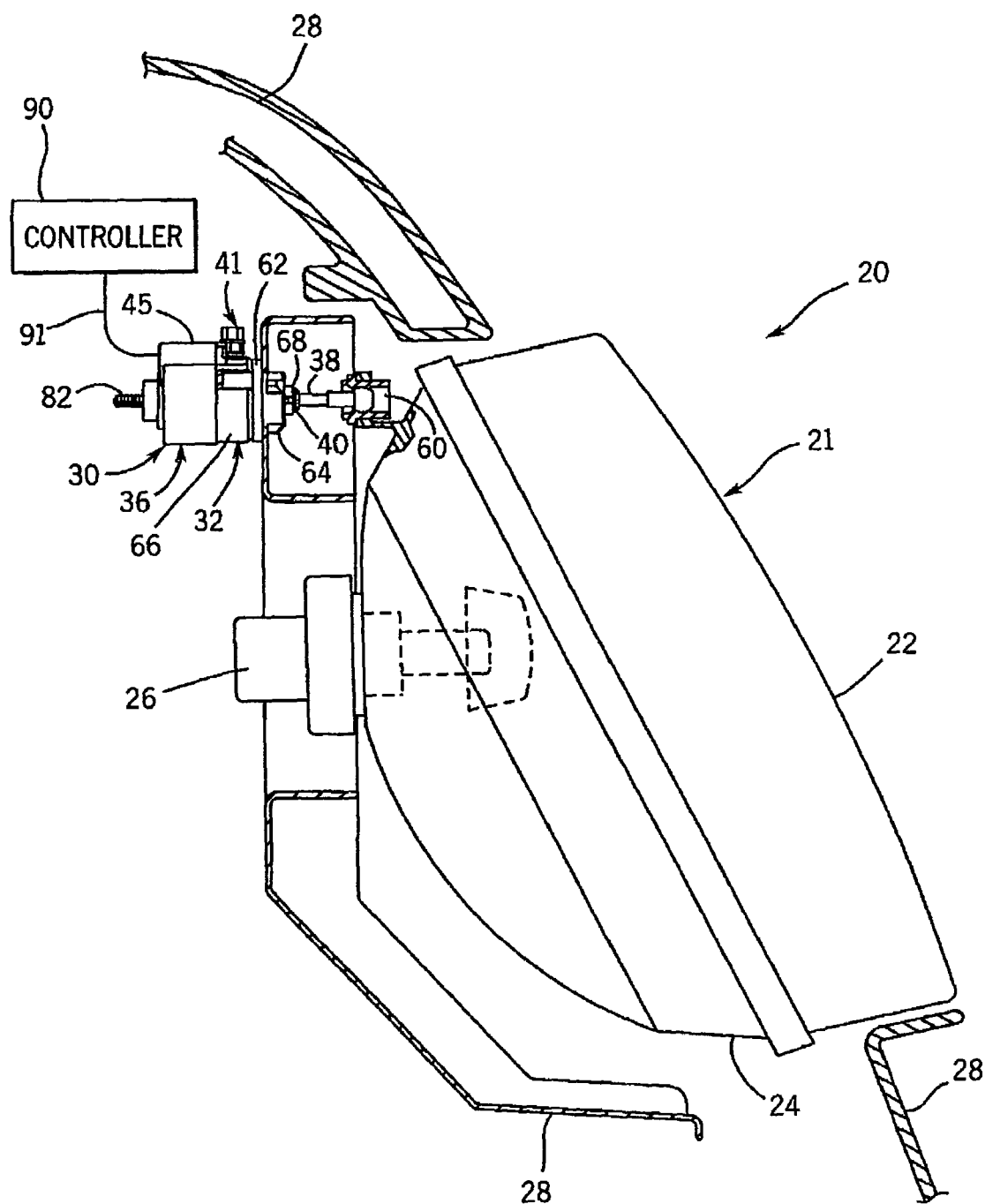
FIG. 11 is a partial cross sectional view of a lamp assembly in accordance with one embodiment of the present invention.

As shown in FIGS. 11 and 13, the adjuster 30 is generally used in connection with a vehicle lamp and forms part of the lamp assembly 20. A lamp assembly 20 comprises a lamp 21 having a lens 22 and a reflector 24 with a bulb 26 mounted therebetween and a mounting bracket 28. In one embodiment shown in FIG. 11, the lamp 21 is pivotally engaged to the mounting bracket 28. In another embodiment shown in FIG. 13, the mounting bracket 28 forms a portion of the lamp 21. In this embodiment, the reflector 24 is mounted to the mounting bracket via a pivot post 100. The adjuster 30 securely engages the mounting bracket 28 and functionally engages the lamp 21. The adjuster 30 may engage any portion of the lamp 21. In one embodiment, the adjuster 30 is positioned to engage the reflector 24 of the lamp 21.

Figure 2:
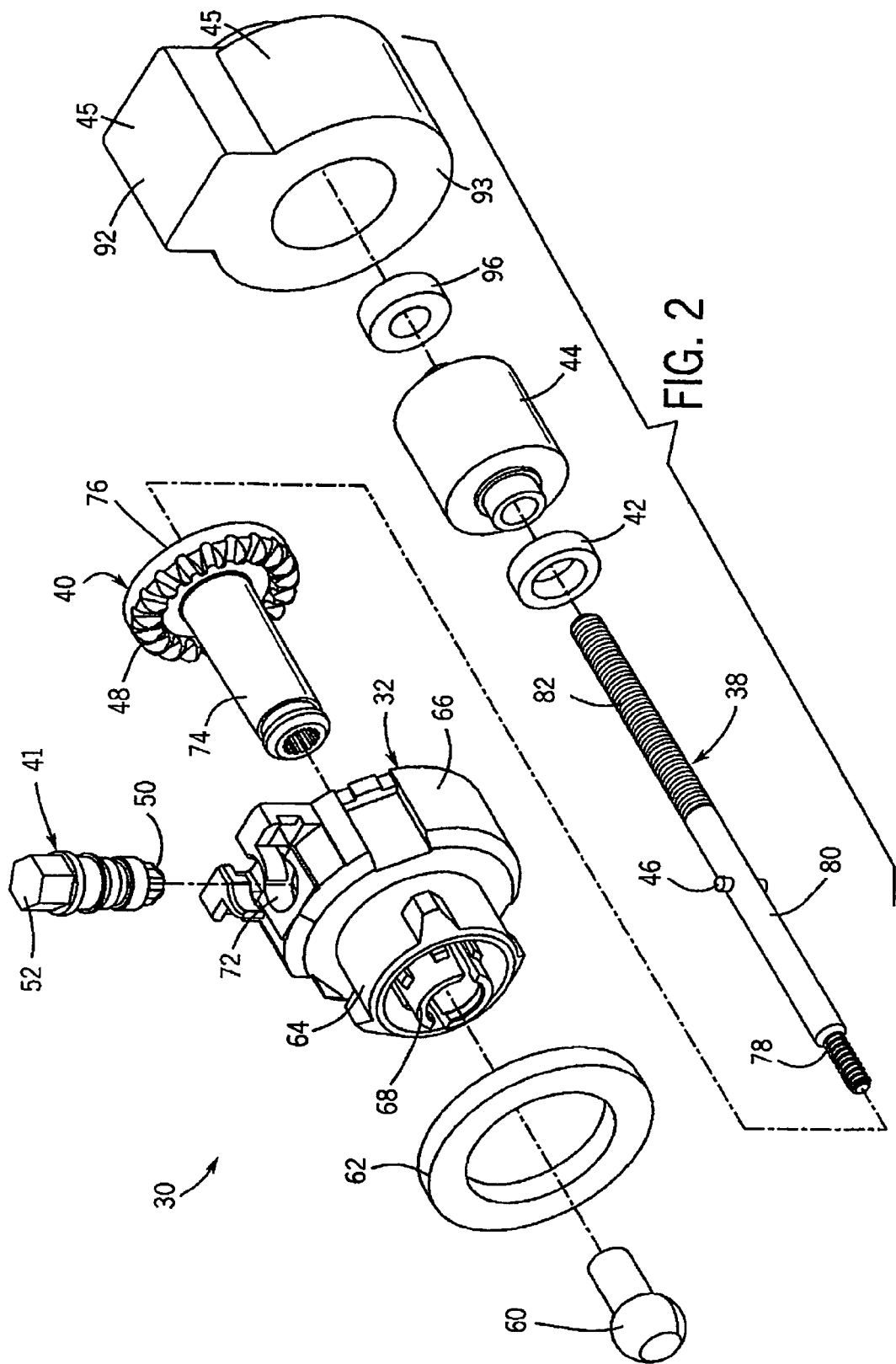
FIG. 2 is an exploded view of the motorized adjuster of FIG. 1.

As shown in FIGS. 2 and 3, the adjuster 30 includes a number of parts. The adjuster 30 includes a housing 32 and a motor 36. The motor 36 is positioned in, or in contact with, the housing 32. A control rod 38 is positioned in and extends through the housing 32 and the motor 36. The control rod 38 interacts with and is functionally engaged to the lamp 21 at one end and the motor 36 at the other. An anti-rotation gear 40 is positioned inside the housing 32. The control rod 38 is inserted into and through the anti-rotation gear 40.

The housing 32 can be constructed from any rigid material and manufactured by any conventional technique. It has been found feasible to manufacture the housing from injection molded plastic. In the embodiment shown in FIG. 1, the housing 32 has a nose 64 and a body 66. The nose 64 engages the mounting bracket 28. The nose 64 may be securely engaged to the mounting bracket 28 via sliding engagement, snap fit, screw in, or other method. Examples of how an adjuster can be mounted to a bracket are shown in the following U.S. Pat. to Burton, the disclosures of which are incorporated herein by reference: U.S. Pat. Nos. 6,474,850; 6,257,747; 6,050,712; 6,042,254; and 5,707,133. In addition the adjuster 30 may be mounted or securely engaged to the mounting bracket 28 via sliding engagement, snap fit, screw in, quarter-turn fashion, or other method. In one embodiment shown in FIG. 11, the housing 32 is engaged to the mounting bracket 28 in a quarter-turn fashion. The mounting bracket 28 has an opening configured to mate with the nose 64. The nose 64 is inserted into the opening and turned, thereby securing the housing 32 to the mounting bracket 28. In one embodiment, the nose 64 is turned sixty degrees. In the embodiment shown in FIGS. 1 and 11, an O-ring or gasket 62 is positioned on the nose 64 and against the body 66. Engagement of the nose 64 with the mounting bracket 28 creates a seal between the body 66, the O-ring or gasket 62, and the mounting bracket 28. Preferably this engagement creates a facial seal between the body 66 and the O-ring 62 and between the O-ring 62 and the mounting bracket 28.

Figure 7:
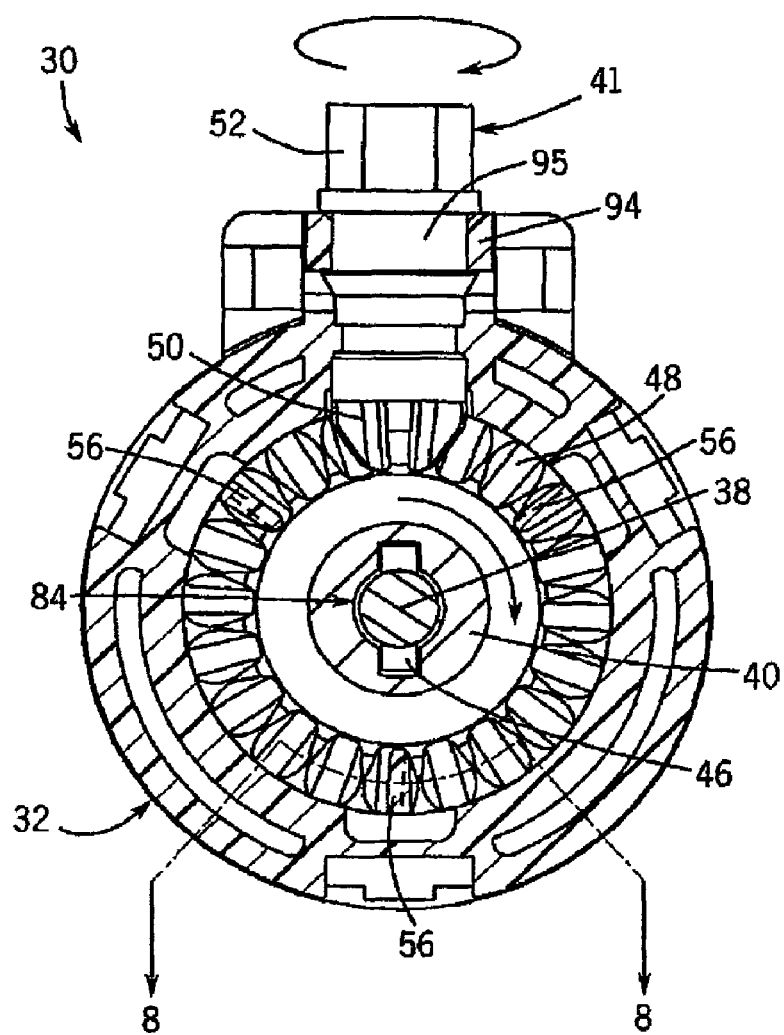
FIG. 7 is a partial cross sectional view of the motorized adjuster of FIG. 5 taken along the plane 7—7 in FIG. 5.
Figure 8:
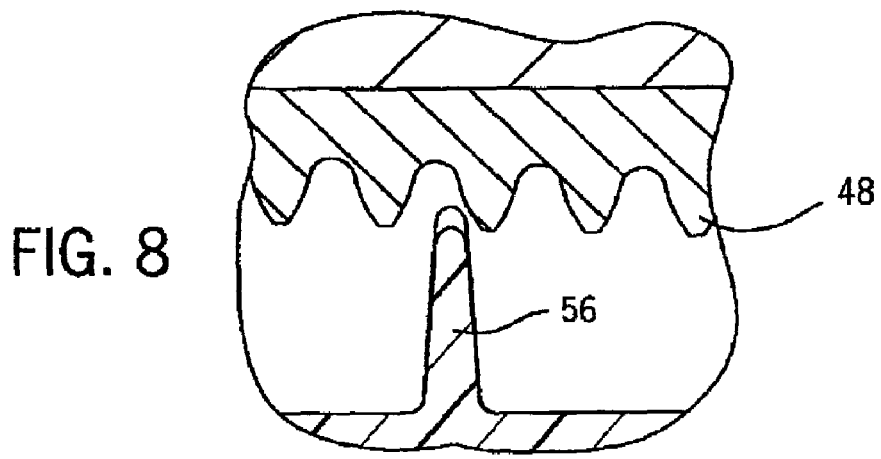
FIG. 8 is a partial cross sectional view of the motorized adjuster of FIG. 7 taken along the plane 8—8 in FIG. 7.

In the embodiment shown in FIGS. 2, 3, 5, and 6, the body 66 has a receptor 68 which extends into the nose 64, a recess 70, and a driver input locator 72. In the embodiment shown in FIGS. 2, 3, 5, and 6, an anti-rotation gear 40 is positioned inside the body 66 of the housing 32. The anti-rotation gear 40 has an extension 74 and a head 76 with a plurality of gear teeth 48 thereon. In the embodiment shown in FIGS. 2 and 3, the gear teeth 48 are oriented toward the extension 74. Alternatively, the gear teeth 48 may be oriented away from the extension 74. Preferably, the anti-rotation gear 40 is constructed from a single piece of plastic, but other configurations are possible. In positioning the anti-rotation gear 40 inside the body 66, the extension 74 is inserted into the receptor 68. In the embodiment shown in FIGS. 5 and 6 the extension 74 snap fits into the receptor 68. Inserting the extension 74 into the receptor 68 causes the head 76 to abut the recess 70. In the embodiment shown in FIG. 3, the recess 70 has at least one flex point 56. The flex point 56 may take a variety of forms. As shown in FIG. 7, it has been found effective for the recess to have three flex points 56, but other numbers of flex posts 56 may be used. The flex point 56 interacts with and functionally engages the anti-rotation gear 40. As shown in FIG. 8, the flex point 56 interacts with the gear teeth 48. The flex point 56 allows the anti-rotation gear 40 to rotate when the adjuster 30 is manually operated via the driver 41, but prevents the anti-rotation gear 40 from rotating when the adjuster 30 is electrically operated via the motor 36. Alternatively, the interference between the housing 32 and the anti-rotation gear 40 may have be great enough to prevent rotation anti-rotation gear 40 when the adjuster 30 is actuated. In such an embodiment, the adjuster 30 does not have any flex points 56 positioned therein.

In the embodiment shown in FIG. 7, the adjuster 30 is manually operated by actuating a driver 41 inserted into the driver input locator 72 (see. e.g. FIG. 2). In one embodiment shown in FIG. 7, the driver 41 is locked in place by a driver retainer 94 positioned in the driver input locator 72. In one embodiment, the driver 41 has groove 95 positioned thereon that snap fits into the driver retainer 94. The driver 41 functionally engages the gear teeth 48 of the anti-rotation gear 40. The gear teeth 48 are configured to functionally interact and geometrically mate with the driver 41, preferably with driver teeth 50 as shown. Actuating the driver 41 causes the anti-rotation gear 41 to rotate. In one embodiment, the driver 41 is a tool such as a flat head, Phillips head, or a TORX® recess driver. In another embodiment shown in FIG. 7, the driver 41 is a driver insert positioned in the drive input locator 72. The head 52 of the driver insert is engaged and turned by a tool such as a wrench, screwdriver, or TORX® driver.

As shown in FIGS. 2–6, the control rod 38 is inserted through the anti-rotation gear 40 and extends past the nose 64 of the housing 32. The control rod 38 has a lamp end 78, a shaft 80 with at least one rotation point 46, and a driver end 82. The lamp end 78 of the control rod 38 is engaged to the lamp 21. In the embodiments shown in FIGS. 11 and 13, the lamp end 78 is engaged to the reflector 24, but other points of attachment to the lamp 21 may be used. In one embodiment, the lamp end 78 is engaged to a ball 60 which is in turn engaged to the lamp end 78. The ball 60 can be any material, but it has been found effective for the ball 60 to be constructed of a flexible material such as plastic. Alternatively, the control rod 38 may be directly engaged to the lamp 21, engaged to a grommet engaged to the lamp 21, and/or may include a ball 60 formed as part of the control rod 38 or any other form of pivoting mechanism.

Figure 9:
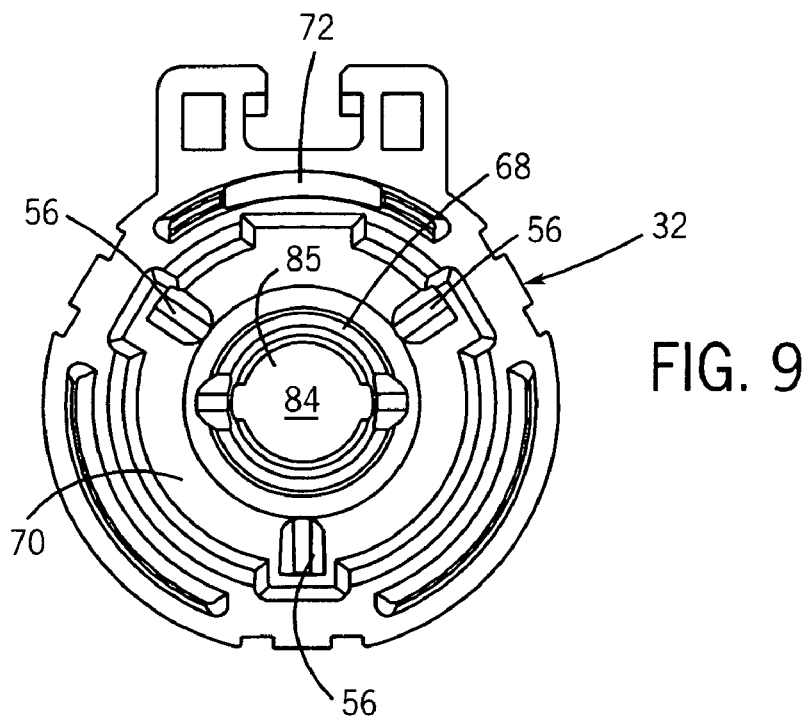
FIG. 9 is a partial cross sectional view of the motorized adjuster of FIG. 3 taken along the plane 9—9 in FIG. 3.
Figure 10:
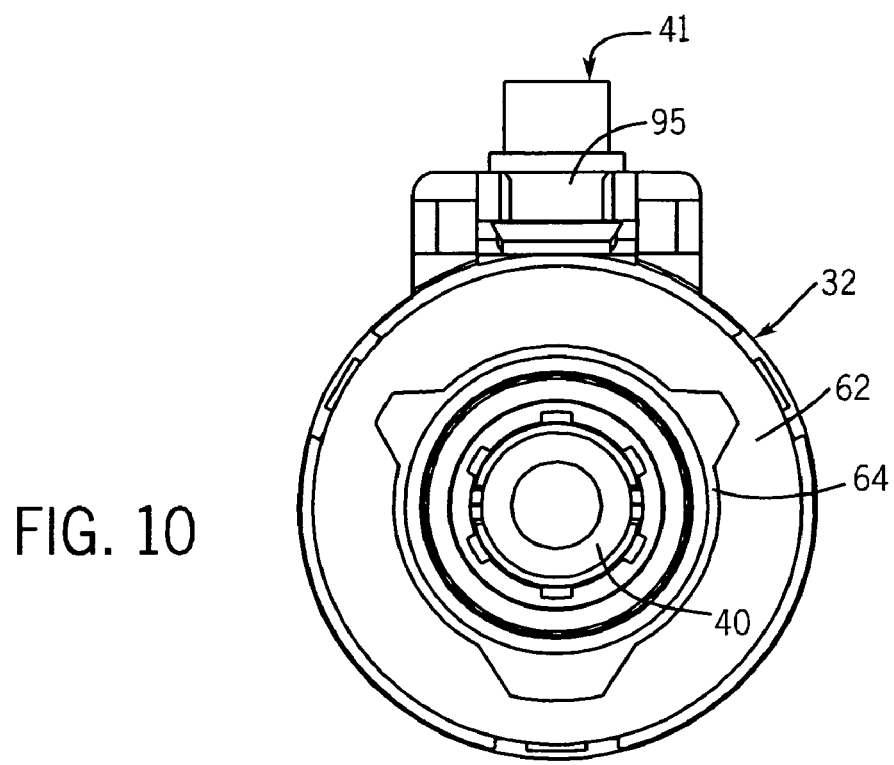
FIG. 10 is a front view of a motorized adjuster in accordance with one embodiment of the present invention.

The shaft 80 is inserted into, passes through, and is in contact with the anti-rotation gear 40. In the embodiment shown in FIGS. 2 and 3, the shaft 80 passes through a bearing 42 fit into the head 76 of the anti-rotation gear 40. The bearing 42 reduces the amount of wear on the anti-rotation gear 40 and the magnetic rotor 44 due to the interaction there between. In one embodiment shown in FIGS. 2 and 3, the shaft 80 passes through an additional bearing 96 positioned between the magnetic rotor 44 and the stator or drive unit 45. The bearings 42 and/or 96 are preferably manufactured from a low friction material such as stainless steel. As shown in FIG. 4, the shaft 80 has at least one anti-rotation point 46. The anti-rotation point 46 can take a variety of forms, shapes, and numbers depending on the exact configuration and desired characteristics of the adjuster 30. The extension 74 of the anti-rotation gear 40 is configured to geometrically mate with the shaft 80 and the rotation point 46. In the embodiment shown in FIGS. 2 and 3, the anti-rotation point 46 is a small bolt inserted through the shaft 80 at an angle, preferably ninety degrees, to the axis of the shaft 80. As shown in FIG. 9, the extension 74 of the anti-rotation gear 40 has an interior 84 with a central round opening 85. The shaft 80 inserts through the central round opening 85. The rotation point 46 functionally engages the anti-rotation gear 40. Rotation of the anti-rotation gear 40 causes the interior 84 of the extension 74 to come into contact with the rotation point 46. The interior 84 exerts a force on the rotation point 46, thus rotating the shaft 80 of the control rod 38. Therefore as shown in FIG. 7, the anti-rotation gear 40 and control rod 38 rotate as a single unit.

Figure 5:
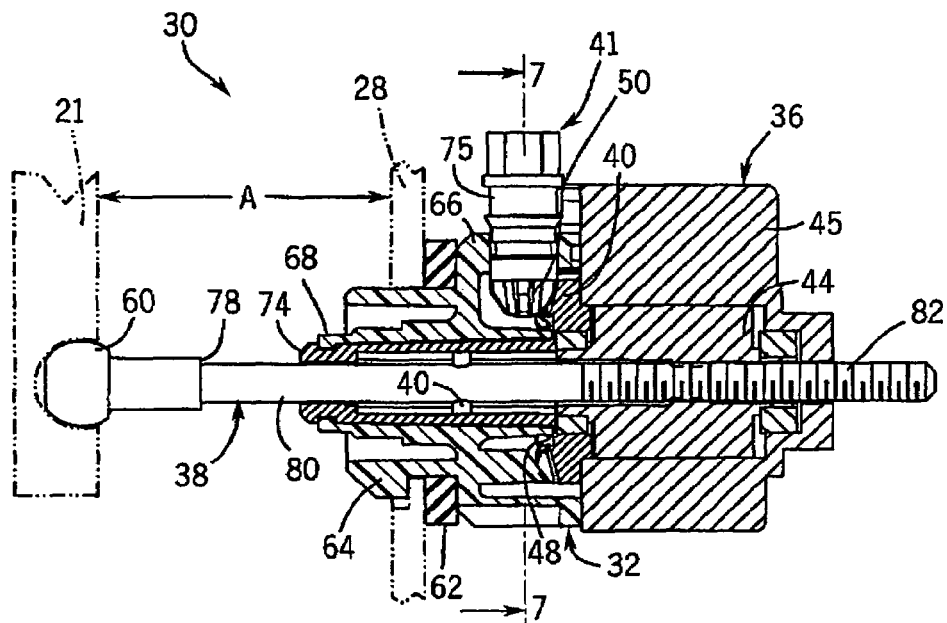
FIG. 5 is a partial cross sectional view of the motorized adjuster of FIG. 1 with a lamp and mounting bracket shown in phantom.
Figure 6:
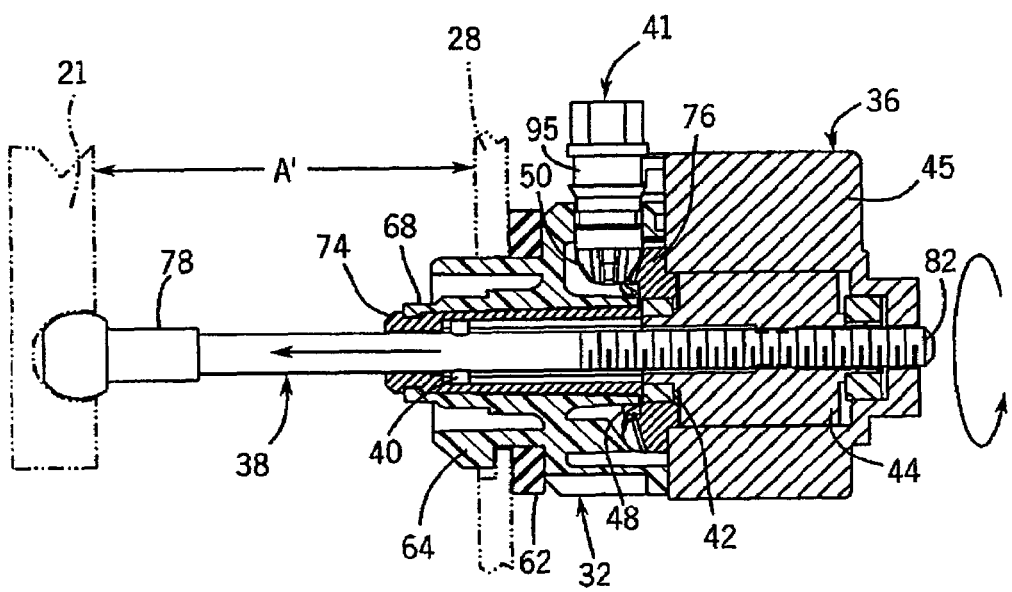
FIG. 6 is a partial cross sectional view of the motorized adjuster of FIG. 1 with a lamp and mounting bracket shown in phantom.

As shown in FIGS. 5 and 6, the driver end 82 of the control rod 38 is inserted in and engaged to the motor 36. In one embodiment, the motor 36 is a stepper motor such as the NMB Stepper Motor PL35L-02-USNJA. In another embodiment, the motor 36 us a linear motor such as the MPL35A-24 linear motor manufactured by Taishan Siang. The motor 36 includes a magnet 44 and a drive unit 45. In one embodiment shown in FIG. 2, the drive unit 45 has a stator 93 and a connector 92. As shown in FIGS. 2, 5, and 6, the magnet 44 is positioned inside the drive unit 45. In one embodiment, the driver end 82 and the magnet 44 are internally threaded. The driver end 82 is threaded into the magnet 44.

In the embodiment shown in FIG. 1, the motor 36 is electrically connected to a power supply via a control cord 91 to the connector 92. In the embodiment, the power supply is the battery of the vehicle. In one embodiment shown in FIGS. 11 and 13, the motor 36 is electrically connected to a control unit 90 by control cord 91. The control unit 90 may be a computer, electrical signal transmitter, or a switch.

The adjuster 30 can be operated either manually or electronically. Regardless of the type of operation, the adjuster 30 adjusts the aim of the lamp 21 via longitudinal movement of the control rod 38. As shown in FIG. 11, the housing 32 of the adjuster 30 is engaged to the mounting bracket 28. The control rod 38 of the adjuster 30 is engaged to the lamp 21. As shown in FIGS. 5 and 6, operation of the adjuster 30 causes the control rod 38 to move longitudinally with respect to the lamp assembly 20. Such movement results in pivoting of the lamp 21, thereby adjusting the aim of the lamp 21.

Manual operation is accomplished by actuating the driver 41 positioned in the body 66 of the housing 32. Actuating the driver 41 results in rotation of the anti-rotation gear 40 and the control rod 38. Rotation of the control rod 38 causes the control rod 38 to move along its axis, as it is threaded through the magnet 44 that is held in position. Rotation of the control rod 38 in one direction causes the control rod 38 to extend towards the lamp 21. Rotation in the opposite direction causes the control rod 38 to retract from the lamp 21. As such, rotation of the control rod 38 results in the control rod 38 moving longitudinally with respect to the lamp assembly 20.

Electrical operation is accomplished by actuation of the motor 36 engaged to the driver end 82 of the control rod 38. Actuation of the motor 36 causes the magnet 44 to rotate therein. As discussed, the driver end 82 and the magnet 44 are threaded. The anti-rotation gear 40 prevents the control rod 38 from rotating during electrical operation of the adjuster 30. Therefore, rotation of the threaded magnet 44 about the threaded portion of the control rod 38 results in the control rod 38 moving along its axis.

The motorized lamp adjuster 30 of the present invention may have other applications aside from use in connection with vehicle lamp assemblies. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

I claim:

1. A lamp adjuster comprising:
   a housing;
   an anti-rotation gear positioned inside the housing;
   a motor engaged to the housing; and, a control rod passing through and engaged with the anti-rotation gear and the motor such that independent operation of the motor or independent rotation of the anti-rotation gear causes axial movement of the control rod with respect to the housing.

2. The lamp adjuster of claim 1 where the control rod has a driver end and a rotation point.

3. The lamp adjuster of claim 2 where the anti-rotation gear is configured to geometrically mate with the rotation point of the control rod such that rotation of the anti-rotation gear causes the control rod to rotate.

4. The lamp adjuster of claim 1 where the motor comprises a magnetic rotor and a driver unit such that the magnet is rotatable by the drive unit.

5. The lamp adjuster of claim 4 where the driver end passes through the magnet and the driver end and the magnet are threaded.

6. The lamp adjuster of claim 1 where the housing has at least one flex point positioned therein such that the flex point interacts with and engages the anti-rotation gear.

7. The lamp adjuster of claim 1 where the anti-rotation gear is positioned inside the housing such that the interference between the anti-rotation gear and the housing prevents the anti-rotation gear from rotating when the lamp adjuster is actuated by operation of the motor.

8. The lamp adjuster of claim 1 where the housing has a driver input locator into which a driver may be inserted to engage the anti-rotation gear.

9. The lamp adjuster of claim 1 where the adjuster is engaged to a lamp and a mounting bracket such that actuation of the adjuster causes the lamp to move with respect to the mounting bracket.

10. The lamp adjuster of claim 1 where the adjuster is engaged to a reflector and a mounting bracket such that actuation of the adjuster causes the reflector to move with respect to the mounting bracket.

11. A lamp assembly comprising;
    a mounting bracket;
    a lamp pivotally positioned on the mounting bracket; and,
    an adjuster including a housing, a motor engaged to the housing, and a control rod, where the control rod passes through the housing and the motor and is engaged by the motor, the housing engaged to the mounting bracket and the control rod engaged to the lamp, where the adjuster further includes an anti-rotation gear positioned inside the housing such that the control rod passes through and functionally engages the anti-rotation gear, and where independent operation of the motor or independent rotation of the anti-rotation gear causes axial movement of the control rod with respect to the housing.

12. The lamp assembly of claim 10 where the control rod has a driver end and a rotation point.

13. The lamp assembly of claim 12 where the anti-rotation gear is configured to geometrically mate with the rotation point of the control rod such that rotation of the anti-rotation gear causes the control rod to rotate.

14. The lamp assembly of claim 13 where the motor and driver end are counter threaded.

15. The lamp assembly of claim 11 where the housing has at least one flex point positioned therein such that the flex point interacts with and functionally engages the anti-rotation gear.

16. The lamp adjuster of claim 11 where the anti-rotation gear is positioned inside the housing such that the interference between the anti-rotation gear and the housing prevents the anti-rotation gear from rotating when the lamp adjuster is actuated by operation of the motor.

17. The lamp assembly of claim 11 where the housing has a driver input locator into which a driver may be inserted to engage the anti-rotation gear.

18. The lamp assembly of claim 11 further comprising a power supply electrically connected to the motor.

19. The lamp assembly of claim 11 further comprising a control unit electrically connected to the motor.

20. The lamp adjuster of claim 11 where the lamp includes a bulb, a reflector, a lens engaged to the reflector, and a bulb engaged to the reflector.

21. A lamp adjuster comprising:
    a housing with at least one flex point therein and a driver input shaft where a driver may be inserted;
    an anti-rotation gear positioned inside the housing such that the at least one flex point interacts with and engages the anti-rotation gear;
    a motor engaged to the housing, the motor including a driver unit with a magnetic rotor positioned therein;
    a control rod that passes through the anti-rotation gear and the magnet and is engaged by the anti-rotation gear and the magnet, the control rod having a driver end and a rotation point; and,
    where the driver end and the magnet are in threaded engagement such that independent operation of the motor causes the control rod to move axially with respect to the housing and the anti-rotation gear is configured to geometrically mate with the rotation point of the control rod such that independent rotation of the anti-rotation gear causes the control rod to rotate and move axially with respect to the housing.

22. The lamp adjuster of claim 21 where actuation of a driver inserted into the driver input locator causes the control rod to rotate and move axially.

23. The lamp adjuster of claim 21 where operation of the motor causes the control rod to be threaded through the magnet and move axially.

24. The lamp adjuster of claim 21 further comprising a power supply electrically connected to the motor.

25. The lamp adjuster of claim 21 further comprising a control unit electrically connected to the motor.

* * * * *